Nov. 19, 1968   Z. ARKUS-DUNTOV   3,411,601
PLURAL DRIVE AXLE VEHICLES WITH A SEPARATE TORQUE
APPORTIONING DRIVE TRAIN TO EACH AXLE
Filed June 23, 1966

INVENTOR.
Zora Arkus-Duntov
BY
L. L. Phillips
ATTORNEY

United States Patent Office 3,411,601
Patented Nov. 19, 1968

3,411,601
PLURAL DRIVE AXLE VEHICLES WITH A SEPARATE TORQUE APPORTIONING DRIVE TRAIN TO EACH AXLE
Zora Arkus-Duntov, Grosse Pointe Shores, Mich., assignor to General Motors Corporation, Detroit, Mich., a corporation of Delaware
Filed June 23, 1966, Ser. No. 559,830
9 Claims. (Cl. 180—44)

ABSTRACT OF THE DISCLOSURE

A drive train for a vehicle having multiple driving axles which drive train in the preferred embodiment has a separate drive path from the engine to each driving axle. Each drive path includes a hydrodynamic torque converter with the converters having torque capacities sized to apportion torque to the vehicle's front and rear wheels in relation to their load at a predetermined vehicle acceleration and with regard to vehicle aerodynamic effect.

---

Figure 1:
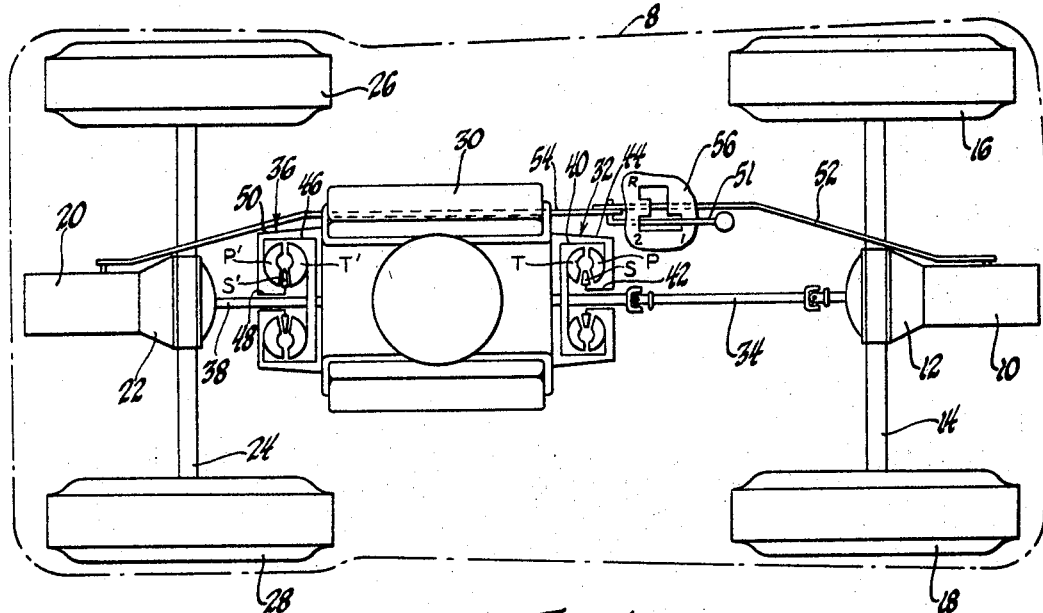

This invention relates to drive trains and more particularly to a drive train for a vehicle having multiple driving axles.

The drive train according to this invention is illustrated in a vehicle having a front driving axle and wheels, a rear driving axle and wheels and a prime mover for driving the axles and wheels. The drive train provides a separate drive path from the prime mover to each driving axle and wheels with each drive path including a hydrodynamic torque converter. The torque converters have predetermined and different torque capacities to apportion torque to the wheels in relation to their load at a predetermined vehicle acceleration and with regard to vehicle aerodynamic effect.

An object of this invention is to provide a drive train for apportioning torque between a plurality of traction means in relation to their load at a predetermined vehicle acceleration.

Another object of this invention is to provide in a vehicle having a forward axle and wheels with one tractive limit and a rear axle and wheels with a different tractive limit, which limits vary with acceleration, a drive train connecting a prime mover to the axles in separate drive paths each having a torque converter, the torque capacities of the torque converters being predetermined to apportion the torque to the wheels in relation to their load at a predetermined vehicle operating condition.

These and other objects of the invention will be more apparent from the following description of the preferred embodiment of the invention illustrated in the drawing.

FIGURE 1 diagrammatically shows a vehicle having a drive train embodying the features of this invention connecting the prime movers to the wheels to provide four-wheel drive.

Figure 2:
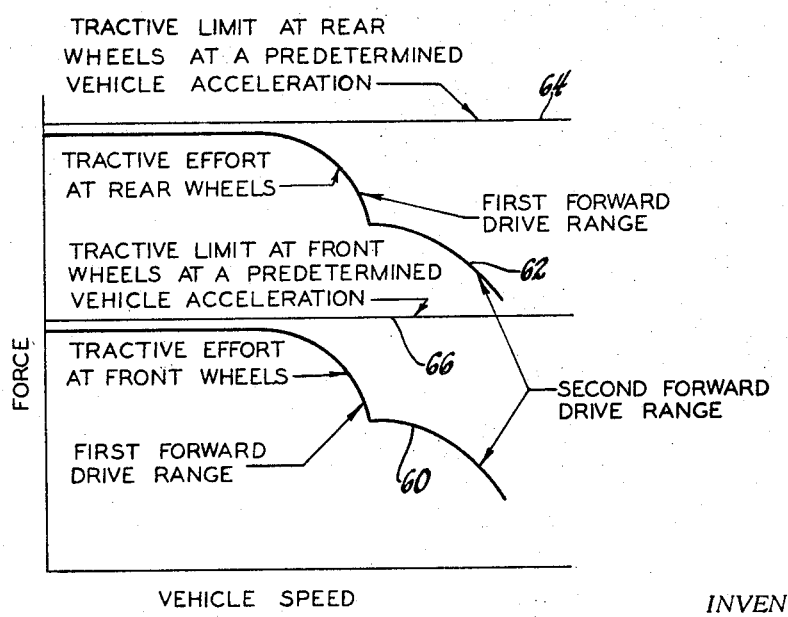

FIGURE 2 shows operating curves.

The invention is illustrated in a four-wheel drive vehicle 8 having a front drive assembly including a two-speed gear box 10 connected by a differential 12 and separate drive shafts in an axle housing 14 to drive the left front wheel 16 and the right front wheel 18. The rear axle assembly has a two-speed and reverse gear box 20 connected by a differential 22 and separate drive shafts in an axle housing 24 to drive the left rear wheel 26 and the right rear wheel 28. The components thus far described may be conventional. The vehicle has a suitable internal combustion engine 30 whose crankshaft is connected at the front end by a hydrodynamic torque converter 32 and a propeller shaft assembly 34 to the front gear box 10 and is connected at the rear end by a hydrodynamic torque converter 36 and a short propeller shaft 38 to the rear gear box 20. Suitable resilient suspension, not shown, supports the major portion of the vehicle weight on the wheels.

The front converter 32 comprises a rotary torque converter housing 40 driven by the engine crankshaft and connected to drive the torque converter pump P. As in conventional three-element torque converters, the pump P circulates fluid in the toroidal circuit to drive the turbine T which is connected to drive the front propeller shaft 34. The stator S provides reaction in the fluid circuit and is held against backward rotation by a one-way brake (not shown) or fixed by hub 42 to the stationary converter housing 44.

In the rear converter 36 the rotary torque converter housing 46 connects the engine crankshaft to drive the pump P' which circulates fluid in the toroidal circuit to drive the turbine T'. Turbine T' is connected to drive the rear propeller shaft 38. The stator S' provides reaction in the fluid circuit and is held against backward rotation by a one-way brake (not shown) or fixed by hub 48 to the stationary converter housing 50.

The gear boxes 10 and 20 are simultaneously and manually controlled by the operator by suitable linkage which may include a shift lever 51 connected by control rod 52 and 54 to operate the gear box 10 and 20, respectively. The shift lever 51 operates in a gate 56 and, with the connecting linkage provided, effects simultaneous conditioning of both gear boxes for either a first or low speed ratio four-wheel drive (1) or a second or high speed ratio four-wheel drive (2).

Reverse is obtained by moving the shift lever to the reverse position (R). In this position the linkage conditions the front gear box 10 in neutral and the rear gear box 20 to provide its reverse speed ratio to thus provide two-wheel drive as compared with the four-wheel drive in the two forward speeds. Where four-wheel drive in reverse is desired, the front gear box is provided with a reverse speed ratio like the rear gear box.

In order to make maximum use of the available torque and power, the tractive limit at all the drive wheels should be approached simultaneously to prevent the wheels carrying the smaller percentage of the vehicle weight from slipping prior to slippage of the heavier loaded wheels; the tractive limit for each wheel being the vertical load on the wheel multiplied by the coefficient of friction between the wheel and supporting road surface. It is well known that the static weight distribution between the front and rear wheels is generally not evenly proportioned because of passenger comfort considerations and/or engineering principles and that on forward vehicle acceleration there occurs a transfer of weight to the rear wheels. In normal vehicle suspension systems, the weight transfer increases with acceleration. Since the tractive limit is related to wheel load the tractive limit at the wheels changes with vehicle acceleration. Furthermore, the front and rear wheel load and thus their tractive limits may also vary considerably as the result of the relative speed between the vehicle and the air stream.

According to this invention the torque capacities of the converters 32 and 36 are determined so that with a vehicle such as that shown having an unequal vertical load distribution at the wheels which changes with acceleration and aerodynamic effect, the converters apportion the torque between the front and rear wheels in relation to their load at a predetermined vehicle operating condition where vehicle acceleration or aerodynamic effect or both cause a substantial change in wheel load distribution. Typical operating characteristics for the drive train, including the converter and gearing, are shown in FIGURE 2 with the curve 60 showing the force made available by the drive train for accelerating the front wheels and the curve 62 showing the larger force made available by the drive train for accelerating the rear wheels. At a predetermined acceleration, the tractive limit of the rear wheels as generally indicated by the curve 64 is greater than the tractive limit for the front wheels generally as indicated by the curve 66. In the first forward four-wheel drive range and what is considered the low speed range, tractive efforts to the rear and front wheels is held close to but does not exceed their respective tractive limits up to the point where peak horsepower starts dropping off rapidly at which time a 1–2 shift is made to the second forward four-wheel drive for optimum engine-load matching at the higher speeds. The aerodynamic effect is greatest at high vehicle speeds and where this effect is considerable, will cause a substantial change in the tractive limit curves. Since low speed maximum acceleration is normally greater than high speed maximum acceleration, the converters may be sized in relationship to low speed acceleration wheel loads where the vehicle is mainly operated in the low speed range and may be sized in relation to high speed acceleration wheel loads where the vehicle is mainly operated in the high speed range. Where high speed and low speed acceleration operation are more evenly divided the converters will be sized in relation to the wheel loads at a vehicle acceleration intermediate maximum low and high speed acceleration. Where the aerodynamic effect is considerable, the converters are sized to compensate for such effect as well as vehicle acceleration.

The torque capacity or torque absorption characteristics of a torque converter are related to several factors which include the flow path diameter and blade angles. By knowing the vehicle acceleration level and aerodynamic effect and accompanying weight distribution for which maximum usable tractive effort at all the wheels is desired, the torque converters are sized to meet the specific application. It will be observed that in FIGURE 1 and with the weight mainly on the rear wheels, the rear torque converter has a larger flow path diameter than the front torque converter so that the engine torque is apportioned between the front and rear wheels with the major portion going to the rear wheels to provide maximum usable tractive effort at all four driving wheels just below their tractive limits and at the optimum vehicle acceleration level determined for the particular vehicle operating condition.

The invention may be modified within the scope of the appended claims.

I claim:

1. In a vehicle, a pair of traction means subjected to different loads in different vehicle operating conditions which are determined at least in part by vehicle acceleration; prime mover means; drive train means operatively connecting said prime mover means to said traction means for providing a separate drive path to each said traction means; and said drive train means including torque apportioning means sized to apportion torque from said prime mover means between said drive paths in proportion to the different loads at said traction means in one of said operating conditions in accordance with certain vehicle acceleration for apportioning different torques to said traction means in relation to their load in said one operating condition.

2. The invention defined in claim 1 and said torque apportioning means comprising torque multiplying means in each said drive path for providing an infinitely variable torque ratio over a finite speed range; said torque multiplying means having different torque ratio characteristics in proportion to the different loads at said traction means for providing said traction means with tractive efforts approaching their tractive limits simultaneously.

3. The invention defined in claim 1 and said one operating condition occurring at a predetermined vehicle acceleration; said torque apportioning means comprising a hydrodynamic torque converter in each said drive path, said torque converters sized to apportion torque between said drive paths in proportion to the different loads at said traction means at said predetermined vehicle acceleration.

4. The invention defined in claim 3 and said predetermined vehicle acceleration being approximately maximum vehicle acceleration in a predetermined speed range, said torque converters sized to apportion torque between said drive paths in proportion to the different loads at said traction means at approximately said maximum vehicle acceleration in said predetermined speed range.

5. The invention defined in claim 3 and said predetermined vehicle acceleration being intermediate maximum vehicl acceleration in a low speed range and maximum vehicle acceleration in a high speed range, said torque converters sized to apportion torque between said drive paths in proportion to the different loads at said traction means at said predetermined intermediate vehicle acceleration.

6. The invention defined in claim 1 and said traction means including rear wheels and front wheels, said rear wheels supporting the major portion of the vehicle mass.

7. The invention defined in claim 1 and said one operating condition occurring at a prdetermined vehicle acceleration and vehicle aerodynamic effect, said torque converters sized to apportion torque between said drive paths in proportion to the different loads at said traction means at said predetermined vehicle acceleration and vehicle aerodynamic effort.

8. In a vehicle, a pair of traction means subjected to different loads in different vehicle operating conditions which are determined at least in part by vehicle acceleration; prime mover means, drive train means operatively connecting said prime mover means to said traction means operable to provide a separate drive path to each said traction means and apportion torque to said traction means in relation to their load in one of said operating conditions; torque multiplying means in each said drive path operable to provide an infinitely variable torque ratio over a finite speed range; said torque multiplying means having torque ratio characteristics proportioned to provide said traction means with tractive efforts approaching their tractive limits simultaneously; and a multi-speed change gear unit in each said drive path in series with a corresponding one of said torque multiplying means and operable to selectively provide different speed ratios.

9. In a vehicle; a pair of traction means subjected to different loads in different vehicle operating conditions which are determined at least in part by vehicle acceleration; prime mover means, drive train means operatively connecting said prime mover means to said traction means operable to provide a separate drive path to each said traction means and apportion torque to said traction means in relation to their load in one of said operating conditions; and a hydrodynamic torque converter in each said drive path; said torque converters having predetermined and different torque capacities to apportion torque to said traction means in relation to their load.

References Cited

UNITED STATES PATENTS

| | | | |
|---|---|---|---|
| 3,352,373 | 11/1967 | Tuck | 180—44 |
| 1,853,058 | 4/1932 | Johnson | 180—49 |
| 3,331,464 | 7/1967 | Van Doorne | 180—70 X |

A. HARRY LEVY, *Primary Examiner.*